Patented Nov. 21, 1950

2,530,389

UNITED STATES PATENT OFFICE 2,530,389

ADDUCTS OF BISNOR-5,7,9(11)-CHOLATRIEN-22-Al-3-ONE

Robert H. Levin and A. Vern McIntosh, Jr., Kalamazoo, Mich., assignors to The Upjohn Company, Kalamazoo, Mich., a corporation of Michigan No Drawing. Application August 23, 1949, Serial No. 111,972

8 Claims. (Cl. 260—239.55)

1

The present invention relates to adducts of bisnor-5,7,9(11)-cholatrien-22-al-3-one, and to a process for the production thereof.

The compounds of this invention can be represented by the following graphic formula:

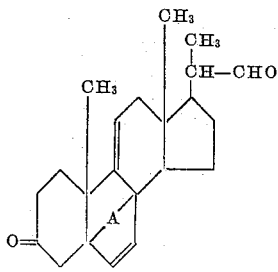

wherein A is an adduct radical derived from a dienophile selected from the group consisting of maleic acid, its anhydride, and its diesters.

Members of this new group of compounds have been prepared and found to be useful in the preparation of further degradation and transformation products, such as the cortical hormones, for which hormones a synthesis is presently in great demand due to their high utility in the alleviation of various physiological abnormalities and the unfortunate shortage of naturally-occurring products from which they can be obtained.

The compounds of the present invention, as previously stated, are useful in the preparation of steroid compounds having an oxygen atom attached to carbon atom eleven. Such compounds are of particular interest in the field of steroid research due to the biological activity of the cortical hormones and certain known derivatives thereof, which oxygenated steroids are known to have biological effects differing markedly from the unoxygenated steroids. It is, therefore, of importance to investigate the oxygenated derivatives of such adducts, particularly those oxygenated at carbon atom eleven, as well as to investigate the biological activity of the adducts themselves and their transformation products. The importance of such investigation is moreover emphasized by the acute shortage of adrenal cortical hormones, and the absence of any present suggestion for alleviation of the said shortage except through organic synthesis.

The compounds of the present invention are usually crystalline solids which are soluble in acetic acid, ethyl alcohol, and ethyl acetate, but insoluble in water and the paraffin hydrocarbon solvents.

It is an object of the present invention to provide a novel group of compounds, containing the bisnorcholatrien nucleus, which are highly useful in the preparation of cortical steroids. It is a further object of this invention to provide a novel process whereby such novel compounds can be prepared in a convenient and economical manner. Other objects will become apparent to those skilled in the art to which this invention pertains.

The objects of the present invention have been accomplished by the controlled oxidation of an adduct of dehydroergosten-3-one to produce adducts of bisnor-5,7,9(11)-cholatrien-22-al-3-one. Adducts included within the scope of the present invention are limited to those derived from the group consisting of maleic acid, its anhydride, and its diesters. Although the invention is described with particular reference to the dimethyl ester adduct, it is to be understood that any ester maleate adduct which is derived from an aliphatic alcohol containing up to and including eight carbon atoms is within the scope of the present invention, the preferred maleates being lower-alkyl esters containing from one to eight carbon atoms, inclusive, in the esterifying group. Among the maleate adducts contemplated by the invention are the methyl, ethyl, propyl, isopropyl, butyl, isobutyl, octyl, and benzyl esters, and the like. For the purposes of the process of the present invention, the esterifying group of the maleate adducts may also contain nonreactive substituents, such as halo, methoxy, hydroxy, and the like.

It is to be understood that the bisnorcholatrien nucleus and the pregnatrien nucleus are alike insofar as the condensed ring systems are concerned. For matters of convenience in nomenclature, the compounds of the invention are considered derivatives of bisnorcholatrien.

The 3-esters of dehydroergosterol, from which the starting adducts for the method of the invention can be prepared, are known compounds which can be synthesized in several ways from ergosterol. For example, ergosterol can be transformed into dehydroergosterol with mercuric acetate according to known methods [Windaus et al. Ann. 465, 157 (1928)]. Alternatively, the 3-hydroxyl group of ergosterol can be acylated prior to the preparation of the dehydro derivative, which is a particularly preferred procedure due to increased yields of dehydroergosterol 3-esters thus obtained. The adducts are then prepared by the addition of maleic acid, maleic anhydride, or an ester of maleic acid to dehydroergosterol [Honigmann, Ann. 508, 89 (1934)], or, if a 3-ester is used, the adduct can be saponified to produce a 3-hydroxy acid, which in turn can be converted to a 3-hydroxy diester maleate adduct by the use of an esterification agent such as diazomethane or the like [Wilds, J. Org. Chem. 13, 763 (1948)]. These maleic acid, maleic anhydride, or maleic acid ester adducts of dehydroergosterol can then be converted into the starting material for the method of the present invention, the adducts of dehydroergosten-3-one by chromic acid oxidation according to known procedure for conversion of a 3-hydroxyl to a 3-keto group [Reichstein, Helv. Chim. Acta. 25, 878 (1942)].

The method of the present invention, then, involves selective oxidation of an adduct of dehydroergosten-3-one having the formula:

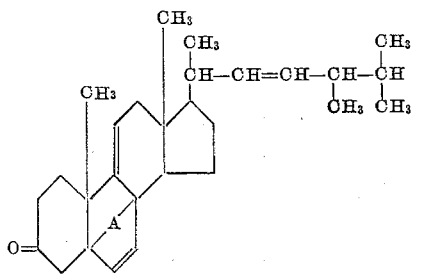

wherein A has the value previously assigned, to produce an adduct of bisnor-5,7,9(11)-cholatrien-3-one-22-al, by dissolving the adduct in a suitable solvent, cooling to about minus eighty degrees to plus thirty degrees centigrade, and passing ozone or ozonized oxygen into the solution until about 1.0 to about 1.25 moles, preferably 1.0 to 1.1 moles, of ozone per mole of adduct have been absorbed. Any loss to the solvent must be taken into consideration in calculating the amount of ozone to be introduced. The temperature of the solution should be maintained below plus thirty degrees centigrade, preferably between a temperature of minus thirty and minus seventy degrees centigrade, during the addition of ozone, although temperatures as low as minus eighty and as high as plus thirty degrees centigrade are operative. The lower temperatures of the range are readily obtained by cooling the solution of the adduct with a bath of solid carbon dioxide in acetone or the like, although various other methods of cooling may be employed. Many of the customary solvents used in ozonizations, such as chloroform, methylene chloride, ethylene chloride, carbon tetrachloride, acetic acid, and the like, can be used for the ozonization reaction.

The 22:23 ozonides thus produced are then decomposed under reductive conditions, that is, in the absence of oxidizing agents, whether added or formed in the course of the reaction by products of decomposition of the ozonide. This means that the excess oxygen formed by decomposition of the ozonide must be prevented from forming hydrogen peroxide by combining with any moisture present, and that molecular oxygen must be prevented from oxidizing the aldehyde thus formed. This can be conveniently accomplished by decomposing the ozonide in glacial acetic acid by the addition of finely-powdered zinc, or by the addition of a catalytic amount of a colloidal metal such as silver, platinum, or palladium, in which latter case a hydrogen atmosphere is also employed. The use of "reductive conditions" for the decomposition of ozonides is well established in the art [Hill and Kelly, "Organic Chemistry," page 63, Blackiston Co., Philadelphia (1943); Gilman, "Organic Chemistry," Second Ed., page 63, John Wiley and Sons, New York (1943); Church et al., J. Am. Chem. Soc. 56, 176–184 (1934); Long, Chem. Reviews 27, 452–454 (1940)].

As is conventional in the decomposition of ozonides with zinc, when the ozonizations are conducted in solvents other than glacial acetic acid, the solvent used for the ozonization is replaced, after completion of the ozonization, by adding glacial acetic acid and removing the lower-boiling solvent by fractional distillation, or the solvent can be removed by careful warming under reduced pressure prior to the addition of acetic acid, if desired. After decomposition of the 22:23 ozonide and removal of the metal, the aldehyde can be recovered by diluting the acetic acid with water, or by other conventional procedure for the recovery of an aldehyde, such as, by formation of an aldehydic derivative, e. g., the 2,4-dinitrophenylhydrazone.

The following preparations and examples are given by way of illustration only and are not to be construed as limiting.

*Preparation 1.—Maleic anhydride adduct of dehydroergosten-3-one*

A suspension of five grams of the maleic anhydride adduct of dehydroergosteryl acetate in 75 milliliters of ten percent aqueous sodium hydroxide was stirred for sixteen hours at room temperature and then diluted with water to 2000 milliliters. The suspended material dissolved in a few minutes, whereafter the solution was allowed to stand one hour and then made acidic by addition of 100 milliliters of three normal hydrochloric acid, giving a gummy precipitate. On crystallization from acetone-water, 4.54 grams of the maleic acid adduct of dehydroergosterol, melting at 163–166 degrees centigrade, was obtained. On further crystallization, the sample melted at 169–173 degrees centigrade.

A solution of 2.0 grams of the maleic acid adduct of dehydroergosterol in forty milliliters of glacial acetic acid was treated with fifty milliliters of one percent chromic anhydride in glacial acetic acid, which was added in portions during an hour. The reaction mixture was allowed to stand for one-half hour, whereafter a small amount of sodium bisulfite was added and the solution diluted with 150 milliliters of water and cooled. A gummy precipitate formed and was extracted with ether. The ether solution was shaken with dilute aqueous sodium hydroxide, giving 2.86 grams of an insoluble sodium salt. The sodium salt of the maleic acid adduct of dehydroergosten-3-one was treated with hydrochloric acid-acetone mixture to obtain the free acid, which was obtained as a solid from an ether-hexane mixture.

A solution of 5.5 grams of the maleic acid adduct of dehydroergosten-3-one, in 120 milliliters of acetic anhydride, was heated under reflux for two hours, and the acetic anhydride then removed by distillation in vacuo, giving 5.48 grams of the maleic anhydride adduct of dehydroergosten-3-one as a resin which was not crystallized.

*Example 1.—Maleic anhydride adduct of bisnor-5,7,9(11)-cholatrien-22-al-3-one*

A solution of 4.64 grams of the maleic anhydride adduct of dehydroergosten-3-one in 100 milliliters of methylene chloride, was cooled to about minus seventy degrees centigrade and ozonized until 500 milligrams (110 percent of the theoretical amount) of ozone had been absorbed. Glacial acetic acid (45 milliliters) was then added, the methylene chloride removed under reduced pressure, and seven grams of finely-divided zinc introduced at a substantially uniform rate over a period of fifteen minutes while maintaining the temperature of the mixture between about fifteen and twenty degrees centigrade. After stirring for an additional fifteen minutes, the zinc was removed by filtration and washed with 45 milliliters of glacial acetic acid. The organic extracts were combined and diluted with three volumes of water, whereupon the desired product separated as a gum. When this gum was dissolved in alcohol and treated with 2,4-dinitrophenylhydrazine hydrochloride, the double dinitrophenylhydrazone of the maleic anhydride adduct of bisnor-5,7,9(11)-cholatrien-22-al-3-one, melting at 194 to 200 degrees centigrade, was obtained, as a crystalline solid.

The maleic anhydride adduct can also be produced by reaction of the maleic acid adduct, obtained in the same manner as given above for the anhydride, by heating with aliphatic acid anhydride, or by heat alone.

*Example 2.—Dimethyl maleate adduct of bisnor-5,7,9(11)-cholatrien-22-al-3-one*

In a manner essentially that described in Example 1, 1.21 grams of the dimethyl maleate adduct of dehydroergosten-3-one was dissolved in 25 milliliters of methylene chloride, ozonized with 113.5 milligrams (105 percent of the theoretical amount) of ozone, the ozonide decomposed with 1.8 grams of powdered zinc, and the acetic acid diluted with water to obtain 0.80 grams of the dimethyl maleate adduct of bisnor-5,7,9(11)-cholatrien-22-al-3-one, which melted at 150 to 158 degrees centigrade.
Analysis:

Calculated for $C_{28}H_{36}O_6$: C 71.67 H 7.74
Found: 71.68 7.67

The double 2,4-dinitrophenylhydrazone, prepared as described in Example 1, melted at 230 to 240 degrees centigrade.

In the same manner, the diethyl, dipropyl, diisopropyl, dibutyl, dioctyl, and other di-lower-alkyl, including mixed lower-alkyl, e. g., methyl ethyl, maleate adducts of bisnor-5,7,9(11)-cholatrien-22-al-3-one are obtained from the corresponding di-lower-alkyl maleate adducts of dehydroergosten-3-one by treatment with ozone and decomposition of the ozonide under reductive conditions, or by formation of the maleic acid adduct and esterification, as with a diazoalkane.

It is to be understood that the invention is not to be limited to the exact details of operation or exact compounds shown and described, as obvious modifications and equivalents will be apparent to one skilled in the art, and the invention is to be limited only by the scope of the appended claims.

We claim:
1. A bisnor-5,7,9(11)-cholatrien - 22 - al-3-one adduct of the formula:

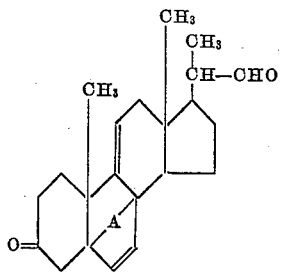

wherein A is an adduct radical derived from a dienophile selected from the group consisting of maleic acid, maleic anhydride, and lower-alkyl diesters of maleic acid, wherein the esterifying radicals are of solely hydrocarbon nature and contain from one to eight carbon atoms, inclusive.

2. The maleic anhydride adduct of bisnor-5,7,9(11)-cholatrien-22-al-3-one.

3. The dimethyl maleate adduct of bisnor-5,7,9(11)-cholatrien-22-al-3-one.

4. The process for the production of a bisnor-5,7,9(11)-cholatrien-22-al-3-one adduct of the formula:

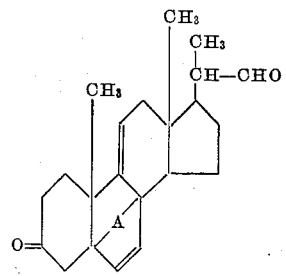

wherein A is an adduct radical derived from a dienophile selected from the group consisting of maleic acid, maleic anhydride, and diesters of maleic acid, which includes the step of ozonizing the 22:23 double bond of an adduct of dehydroergosten-3-one of the formula:

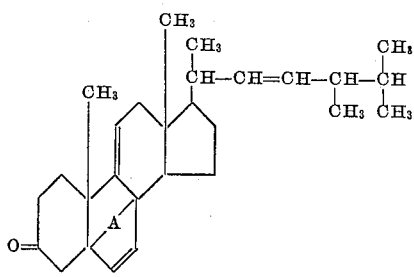

wherein A is an adduct radical derived from a dienophile selected from the group consisting of maleic acid, maleic anhydride, and diesters of maleic acid wherein the esterifying groups are non-reactive under the conditions of reaction and contain from one to eight carbon atoms, inclusive, with from about 1.0 to about 1.25 moles of ozone per mole of starting dehydroergosten-3-one adduct, in an organic solvent for the reaction, at a temperature between about minus eighty and plus thirty degrees centigrade, decomposing the thus-produced 22:23 ozonide under reductive conditions, and isolating the bisnor-5,7,9(11)-cholatrien-22-al-3-one adduct from the reaction product.

5. The process of claim 4, wherein the reaction temperature is between about minus thirty and minus seventy degrees centigrade.

6. The process of claim 4, wherein the ozonide is decomposed with powdered zinc in glacial acetic acid.

7. The process of claim 4, wherein the starting compound is the maleic anhydride adduct of dehydroergosten-3-one, and the product is the maleic anhydride adduct of bisnor-5,7,9(11)-cholatrien-22-al-3-one.

8. The process of claim 4, wherein the starting compound is the dimethyl maleate adduct of dehydroergosten-22-al-3-one, and wherein the product is the dimethyl maleate adduct of bisnor-5,7,9(11)-cholatrien-22-al-3-one.

ROBERT H. LEVIN.
A. VERN McINTOSH, Jr.

No references cited.